United States Patent [19]

Young et al.

[11] Patent Number: 5,251,041
[45] Date of Patent: Oct. 5, 1993

[54] METHOD AND APPARATUS FOR MODIFYING A VIDEO SIGNAL TO INHIBIT UNAUTHORIZED VIDEOTAPE RECORDING AND SUBSEQUENT REPRODUCTION THEREOF

[76] Inventors: Philip L. Young, 1548 County Rd. 59, Fremont, Ohio 43420; Leonard H. Greenberg, 1147 Elm Ave., #204, Glendale, Calif. 91201

[21] Appl. No.: 718,622

[22] Filed: Jun. 21, 1991

[51] Int. Cl.⁵ .......................... H04N 5/78; H04N 9/79
[52] U.S. Cl. ..................................... 358/310; 358/335; 360/37.1; 380/5
[58] Field of Search ............... 358/310, 335, 329, 315, 358/316, 319, 17, 148, 150, 12, 19; 360/60, 37.1; 380/3, 4, 5

[56] References Cited

U.S. PATENT DOCUMENTS

| | | | |
|---|---|---|---|
| 4,163,253 | 7/1979 | Morio et al. | 358/120 |
| 4,488,183 | 12/1984 | Kinjo | 358/319 |
| 4,571,642 | 2/1986 | Hofstein | 360/37.1 |
| 4,577,216 | 3/1986 | Ryan | 358/19 |
| 4,737,862 | 4/1988 | Koga | 358/329 |
| 4,819,098 | 4/1989 | Ryan | 380/5 |

Primary Examiner—Howard W. Britton
Assistant Examiner—Huy Nguyen
Attorney, Agent, or Firm—William J. Clemens

[57] ABSTRACT

A method and an apparatus which modifies a video signal such that a conventional video monitor reproduces a normal picture from the modified video signal, whereas a videotape recording of the modified video signal and subsequent playback thereof produces disturbances in the displayed picture. Predetermined portions of the video signal are identified and copy protection signals are added thereto. The signal mixing and delaying characteristics of a videotape recorder comb filter are exploited to modify, produce and relocate synchronization and burst interfering copy protection signals added to an original videotape recording.

37 Claims, 9 Drawing Sheets

METHOD AND APPARATUS FOR MODIFYING A VIDEO SIGNAL TO INHIBIT UNAUTHORIZED VIDEOTAPE RECORDING AND SUBSEQUENT REPRODUCTION THEREOF

BACKGROUND OF THE INVENTION

This invention relates to a method and apparatus for modifying a video signal in a manner such that the modified video can be displayed in a normal fashion on a standard monitor device (television, video monitor, etc.), yet copies made of the modified video signal by videotape recorders will reproduce a video signal containing disturbances which cause a generally unviewable display on a standard television or other video monitor.

Industries involved in the distribution of video program material on all popular formats suffer substantial revenue losses due to unauthorized copying of video program material onto videotapes. The amount of revenue lost by these industries has increased substantially as the consumer video cassette recorder (VCR) becomes increasingly popular. To reduce these losses, several systems have been devised that modify a video signal in such a manner o as to interfere with the processes involved in the recording of these video signals onto videotape.

Several of these processes, exemplified in U.S. Pat. Nos. 4,475,129, 4,631,603 and 4,819,098, insert signals into a video waveform that interfere with the automatic gain control (AGC) circuitry in a VCR. The AGC circuitry is responsible for ensuring that proper signal levels are recorded onto videotape. The signals inserted into a video waveform cause the AGC circuits in some VCRs to record an incorrect signal level onto videotape, while generally not affecting the AGC circuits of monitor devices. When played back, videotape copies made of these modified video signals can exhibit signal to noise ratio variations, synchronization (sync) instabilities, luminance level shifts, color (chroma) noise or other disturbances that cause the video program material to be generally unviewable on a monitor device.

Other systems, exemplified in U.S. Pat. Nos. 3,963,865 and 4,571,642, modify a video waveform in such a manner that a recording VCR cannot generate an accurate control track. The control track is a special signal recorded onto videotape during the record process which is used to synchronize the servo circuits in a VCR during playback. The control track is generally derived from the vertical sync pulses contained in a standard video waveform. Exploitation of the differences in vertical sync separating circuitry between many VCRs and monitor devices has lead to the development of systems that modify a video signal so as to allow a monitor to extract the vertical sync signal from a video waveform while preventing a VCR from doing the same. The playback of copies made of these modified signals can exhibit speed and tracking variations producing an unacceptable display on a monitor device.

Another system, as described in U.S. Pat. No. 4,577,216 inserts phase noise or other modifications into the chroma burst portion of a video waveform. The chroma burst is used by monitor devices to synchronize the local subcarrier reference oscillator contained therein as well as for maintaining proper chroma levels. However, the chroma burst is also used by servo circuits in a VCR to adjust motors for variations in tape and headwheel speed. As the signals derived from tape usually contain greater and faster fluctuations of burst amplitude and phase than those broadcast from other sources direct to a monitor device, VCRs generally contain circuits that respond faster to these variations than the corresponding circuits contained in typical monitor devices. Exploitation of these differences in circuit characteristics has lead to development of a system that allows normal display of a modified video signal on a monitor device, while producing copies recorded by a VCR that exhibit generally unviewable chroma noise and chroma variations upon playback.

Another group of processes modify the timebase of a video signal, as described in U.S. Pat. Nos. 4,488,176 and 4,673,981. Certain portions of a video waveform are used by monitoring devices and VCRs to synchronize various circuits necessary for their proper operation. More specifically, the field rate which is derived from vertical sync, and the line rate which is derived from horizontal sync. In a VCR, these signals are used as references to adjust servo circuits which maintain correct tape and headwheel speed, and to correct for signal phase variations. Because these VCR circuits are generally more sensitive to sync timing variations than circuits used to synchronize scanning in a monitor device, several systems have been devised that exploit these differences. A video waveform modified by these systems will usually produce an acceptable display on a monitor device, while a copy of a thusly modified video signal recorded by a VCR, when played back, will exhibit speed and tracking fluctuations that produce a generally unacceptable display on a monitor device.

Another system as described by U.S. Pat. No. 4,488,183, inserts a positive going pulse, the width of which is considerably smaller than the pulse width of a horizontal sync signal, within the area defined by the horizontal sync signals. This system relies upon differences between the sync separating circuitry time constants of VCRs and video monitor devices. Adequate detection of the reduced area sync pulses may occur in video monitors and televisions, while VCRs, with normally shorter time constants, produce incorrectly times sync signals that interfere with VCR chroma processing circuitry. Additional compensation for the reduced area of the modified horizontal sync pulses may be needed for proper display on a video monitor device, and may be provided by the addition of a negative going pulse inserted prior to the modified horizontal sync pulse.

All of these systems exploit differences between circuits in monitor devices and their counterpart circuits in VCRs. Because a wide variety of VCR and monitor circuit methodologies exit, many of the above mentioned systems perform as desired on only a fraction of VCRs on the market. Also, due to circuit similarities that exist between some monitor devices and VCRs, many monitor devices display unacceptable picture anomalies when attempts are made to view the modified video signals, even before attempts are made to copy these signals. Additionally, many of these current systems cannot be used with certain distribution formats because the modified video signals interfere with the normal operation of circuits used by the reproduction equipment required for those specific distribution formats.

The above mentioned disadvantages detract from the practicality and desirability of these currently available copy protection systems.

SUMMARY OF THE INVENTION

In accordance with the invention described herein, a video signal is modified in such a manner so as to prohibit the making of an acceptable copy of the video signal by a VCR. The present invention discloses unique methodologies for modifying a video waveform in such a way that the signals that interfere with the viewability of copies made by a VCR are produced only after recording and playback of the copied tape, and therefore, the modifications do not interfere with the viewability of the video program material prior to attempts to copy same. Additionally, these unique methodologies are generally more compatible with a wider variety of distribution formats than systems currently in use.

The system according to the present invention utilizes the fact that VCRs contain comb filter circuits to separate chroma signals and reduce chroma crosstalk from adjacent video tracks during reproduction. These comb filter circuits generally delay the reproduced video signal by one horizontal line (63.556 $\mu$S in NTSC systems), invert this delayed signal, and sum it with the non-delayed video signal. The present invention exploits both the signal delaying and summing characteristics of these comb filters.

In one embodiment of the present invention, frequency or phase modulated signals that fall within chrominance circuitry bandwidth are inserted at specific intervals and positions within a video waveform relative to horizontal blanking intervals of the video waveform. These inserted signals, being of chrominance bandwidth, are filtered and removed from the video signal in a monitor device prior to the derivation of sync signals necessary for normal operation, and therefore do not adversely affect viewability of the modified video signal. When a copy of this modified signal is made on a VCR however, the comb filter present in the reproduction circuitry of a VCR converts the frequency or phase modulated signals to amplitude modulated signals whose modulating frequency is directly related to the frequency of the signal used to frequency or phase modulate the inserted chroma bandwidth signals. If the frequency chosen to modulate the inserted chroma signals is one that falls within the luminance bandwidth of the video signal, the conversion from frequency or phase modulation to amplitude modulation by the comb filter produces a signal that passes through the monitor device's luminance filters and hence interferes with the operation of the horizontal sync circuits of a monitor device.

In another embodiment of the present invention, the inserted chroma bandwidth signals can be modulated as above, amplitude modulated, or modulated with combinations thereof. These signals are then inserted into a video waveform prior to vertical sync. Again, because the chroma bandwidth signals are removed in a monitor device prior to sync signal extraction, the inserted signals have no effect on normal monitor operation. In the case of amplitude modulation of the inserted signal, where the modulation frequency falls within the luminance bandwidth, the signal is inserted with specific levels of inserted chroma bandwidth signal and luminance bandwidth signal level to prevent the applied modulation from exceeding the sync threshold of a monitor device sync extraction circuitry. When a copy of a video signal containing these inserted signals is made by a VCR, the comb filter in the VCR, upon playback, creates a signal in the video waveform delayed one horizontal line with respect to the originally inserted signal. If the originally inserted signal is positioned one horizontal line prior to the portion of the video waveform used by the monitor device for vertical sync extraction, the delay characteristics of the comb filter will produce a signal that now interferes with normal vertical sync extraction in the monitor device.

In another embodiment of the present invention, chroma bandwidth signals are inserted at various positions along a horizontal line. In addition, negative-going pulses which will cause a burst gate trigger to occur in a VCR or video monitor device are inserted on a subsequent line. When a thusly modified video signal containing these modifications is passed through a comb filter in a VCR, the delaying characteristics of the comb filter will cause the inserted chroma signals to be relocated to the back porch of the negative-going pulses. Thus, the burst gate circuitry in a VCR or monitor will cause that device to sample the incorrect chroma signals previously inserted. Accordingly, the inserted chroma signals can be distorted in a variety of ways in order to effect a maximum disruption of normal chroma circuitry operation.

It is therefore an object of the present invention to modify a video signal in such a way that it can be displayed in a normal manner on a standard television or video monitor device, yet copies made of the modified video signal by VCRs will reproduce a video signal containing disturbances which cause a generally unviewable display on monitor devices.

A second object of this invention is to insert copy protection signals of specific frequency and modulation characteristics into a standard video waveform which do not interfere with the viewability of a thusly modified video signal on standard monitor devices.

A third object of this invention is to insert copy protection signals of specific frequency and modulation characteristics into a standard video waveform, such that when recorded and played back on a VCR, the comb filter circuitry in the VCR changes the qualities of the inserted signals in such a way as to cause interference with the sync circuitry in a monitor device.

A fourth object of this invention is to insert copy protection signals of specific frequency and modulation characteristics into a video waveform, such that when recorded and played back on a VCR, the comb filter circuitry in the VCR changes the qualities of the inserted signals in such a way as to cause interference with the burst sampling circuitry of a VCR or monitor device.

Other objects and advantages of the present invention will be made evident from the detailed description and related drawings contained herein.

BRIEF DESCRIPTION OF THE DRAWINGS

The above, as well as other advantages of the present invention, will become readily apparent to those skilled in the art from the following detailed description of preferred embodiments when considered in the light of the accompanying drawings in which.

DESCRIPTION OF THE PREFERRED EMBODIMENTS

Currently available VCRs of various formats use a circuit called a comb filter to assist in the extraction of chroma information from the signals recorded onto tape.

Figure 1:
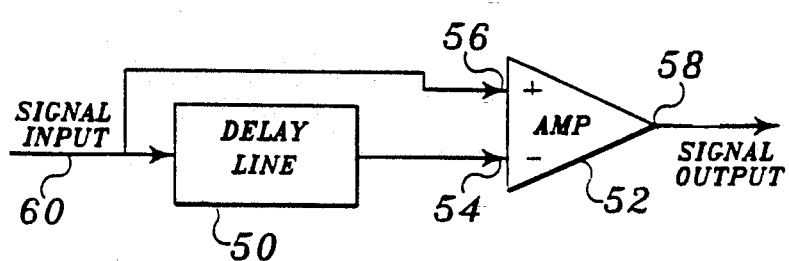
FIG. 1 is a schematic block diagram of a typical comb filter utilized in videotape reproduction equipment for the extraction of chromina informa.

FIG. 1 illustrates a simplified schematic block diagram of a typical comb filter circuit. Such a circuit consists of a delay line 50 having an output connected to an inverting input 54 of a differential amplifier 52. A non-inverting input 56 of the amplifier 52 and an input of the delay line 50 are connected to a signal input line 60. The amplifier 52 has a signal output 58.

Normal operation of such a circuit is reliant upon the fact that the maximum signal value at the output 58 can occur only when the signals applied to the inverting input 54 and the non-inverting input 56 of the amplifier 52 are one hundred eighty degrees out of phase with respect to each other. If the signals applied to the inputs 54 and 56 are exactly in phase, the output from the amplifier 52 will be at minimum. Any phase relationship between these two extremes will produce varying measures of output from the amplifier 52, the value of which is directly related to the relative phase difference between the signals applied to the two inputs 54 and 56.

One of the signal inputs to the amplifier 52 passes through the delay line 50. The delay line 50 delays the input signal on the line 60 before applying that signal to the input 54 of the amplifier 52. The length of the time delay chosen for the delay line 50 in most NTSC video systems is 63.556 $\mu$S. All video waveform specifications discussed herein represent those typically found in NTSC standard video systems, although the present invention can be incorporated into other video standards. For any given signal applied to the signal input line 60, the output from the amplifier 52 can be at a maximum value only when the input line signal is one hundred eighty degrees out of phase with respect to the signal that was applied to the input to the delay line 63.556 $\mu$S earlier. The characteristics of combining the delayed and non-delayed signals in the differential amplifier 52, and the signal delay properties of the delay line 50 are both exploited in the system according to the present invention.

Current video standards provide for the insertion of chroma information into a standard monochrome video signal through the use of frequency interleaving techniques, to allow the two bands of information to overlap. Luminance bandwidth information is contained within those frequencies from D.C. to 4.2 Mhz which possess the relationship $n \times f_H$, where "n" is an integer value and "$f_H$" is the horizontal scan frequency of approximately 15.75 Khz. Chroma information contained within a standard NTSC video signal is confined to a band of frequencies extending 600 Khz either side about a chroma subcarrier frequency of approximately 3.58 Mhz, and possesses the relationship $n \times \frac{1}{2} f_H$. However, all frequencies from D.C. to 4.2 Mhz will be considered chroma bandwidth signals if they possess the relationship $n \times \frac{1}{2} f_H$, because this defines the position occupied by chroma information within the interleaved video signal.

The operation of a comb filter relies upon the specific line to line phase relationships of the luminance and chrominance bandwidth signals. These two sets of frequencies, being on a given horizontal line of a video signal, have particular phase relationships relative to similar information contained within the preceding line of video information. Specifically, luminance bandwidth frequencies are generally in phase with respect to the preceding line of luminance information, while chroma bandwidth frequencies possess the characteristic of generally being one hundred eighty degrees out of phase with respect to the preceding line of chroma information.

As a line length in standard NTSC video is approximately 63.5 μS, and because of the stated line to line phase relationship of chroma bandwidth frequencies, a comb filter circuit such as that shown in the FIG. 1 can therefore be used to assist in the extraction of chroma information from a video signal. Changing the inverting input 54 to a non-inverting input will convert such a chroma comb filter to a luminance comb filter, wherein only signals that are in phase with respect to the previous line of video information will be provided at the output 58.

Figure 2:
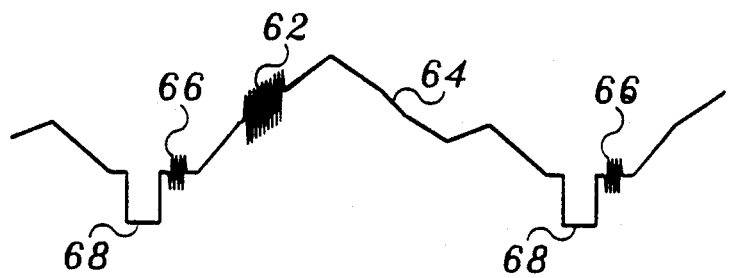
FIG. 2 is a waveform diagram of a typical horizontal line of video information.

The FIG. 2 is a waveform diagram of a typical line of video information. A chroma subcarrier 62 is superimposed upon a luminance signal 64. As chroma information is encoded into the subcarrier 62 through the use of phase modulation, a subcarrier reference signal, used as a phase reference by monitor devices, is included in the waveform and is commonly referred to as a chroma burst 66. It should be appreciated that as the chroma information 62 is phase modulated, a comb filter would normally produce less than maximum output were it not for the fact that chroma information usually does not vary much from one video line to the next. Also shown are two horizontal sync pulses 68. These negative going pulses of approximately 4.7 μS duration are used to synchronize horizontal scanning circuits in a video monitor device. It should be appreciated that the chroma bandwidth signals 66 and 62, as well as similar signals included in other drawing figures contained herein, are shown diagrammatically only and are not intended to be accurate in scale, phase, or waveshape.

Figure 3:
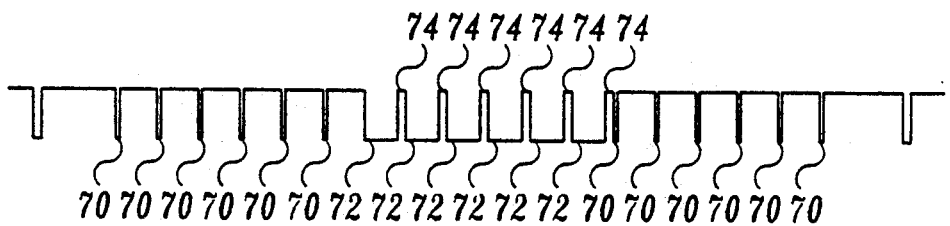
FIG. 3 is a waveform diagram of the portion of a typical video waveform associated with vertical sync signals.

The FIG. 3 is a waveform diagram of the section of a typical video waveform responsible for synchronization of the vertical scanning circuits in a video monitor device. This portion of the video waveform consists of twelve negative going equalization pulses 70 of approximately 2.35 μS duration, six vertical broad pulses 72 of approximately 27.05 μS duration, and six vertical serrations 74 of approximately 4.7 μS duration.

Figure 4:
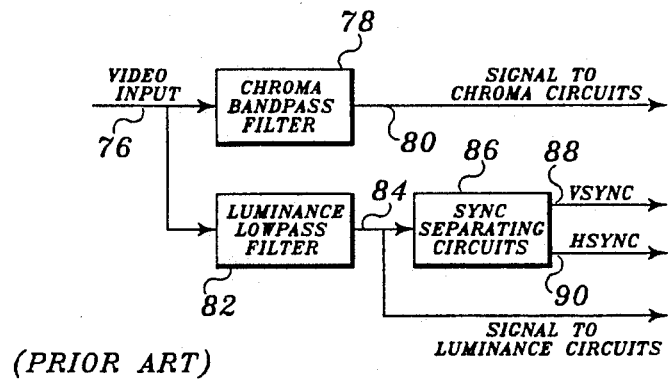
FIG. 4 is a schematic block diagram of the chrominance and luminance separating circuits as well as sync signal separation circuits present in a typical video monitor device.

The FIG. 4 is a schematic block diagram of the circuits used in a typical video monitor device for extraction of the various signals contained in a video waveform. A video input line 76 is connected to an input of a chroma frequency bandpass filter 78 having an output 80 which feeds additional chroma processing circuits. The video input line 76 is also connected to an input of a luminance frequency lowpass filter 82 having an output 84 which feeds additional luminance circuitry. The lowpass filter output 84 is also connected to an input of sync separating circuits 86 responsible for extracting from the video signal vertical sync signals (VSYNC) generated at an output 88 and horizontal sync signals (HSYNC) generated at an output 90. The sync separating circuits 86 typically operate by detection of a specific video level, referred to as the sync threshold, and are able to distinguish vertical sync from horizontal sync by detecting the difference in the time durations of those signals.

Figure 5:
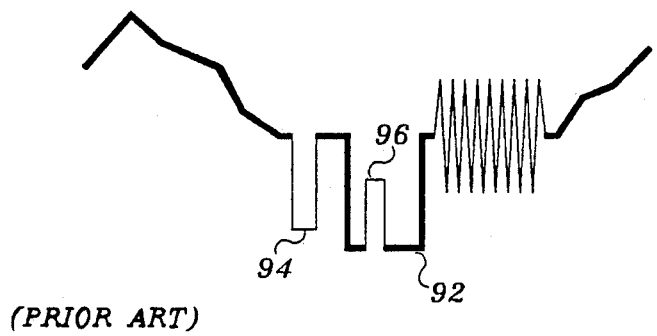
FIG. 5 is a waveform diagram of a portion of a typical video waveform into which signals have been inserted to interfere with horizontal scanning circuits of a video monitor device.

The FIG. 5 is a waveform diagram of a portion of a video waveform surrounding and including one horizontal sync pulse 92, along with some possible modifications. If a signal of sufficient amplitude and duration is inserted prior to the horizontal sync pulse 92, as shown by a negative going interference signal 94, the horizontal sync circuit of a monitor device will attempt to synchronize to the inserted signal 94. Such a signal can, instead of or in combination with the signal 94, be inserted inside the edges of the horizontal sync pulse 92 as depicted by a positive going interference signal 96. The falling edge of this signal 96 will cause the horizontal sync circuit of a typical video monitor device to trigger the horizontal scanning circuits at an incorrect time.

Figure 6:
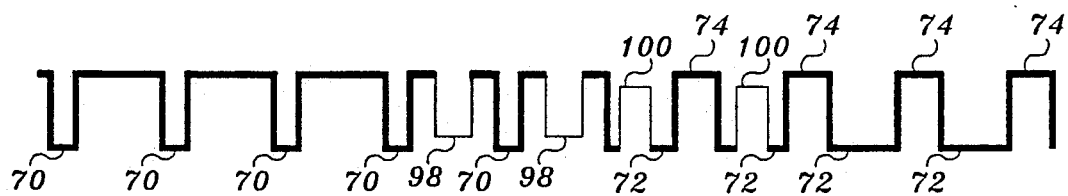
FIG. 6 is a waveform diagram of a typical video waveform into which signals have been inserted to interfere with vertical scanning circuits of a video monitor device.

The FIG. 6 depicts how interference signals of sufficient amplitude and duration can be positioned prior to the area of a video waveform responsible for vertical synchronization as indicated by interference signals 98. Similar signals can, instead of or in combination with the signals 98, be placed in the area of the vertical broad pulses 72 as shown by interference signals 100. If signals similar to the signals 94, 96, 98 and 100 are amplitude modulated, changed in duration, or both at various rates, a high degree of interference can be caused in the scanning circuits of a video monitor device. The signals 94, 96, 98 and 100, though diagrammatically shown as square waves, are not limited to that particular waveform. Many different frequencies and waveforms can be inserted in the areas indicated to produce varying patterns and intensities of display disturbances on a typical monitor device. These interfering signals, as described, though useful in creating unviewable displays on a monitor device, by themselves are not useful for the purpose of preventing the videotape copy process. The reason for this being that, if the signals were inserted directly as shown into a video format, the signals would interfere with the desirable display and viewability of the original or master video prior to an attempt to copy this video on a VCR.

Therefore, and in accordance with the stated objects of this invention, a method has been conceived for generating signals similar to the interference signals 94, 96, 98 and 100 in a video signal only after being copied onto Videotape by a VCR.

Figure 7:
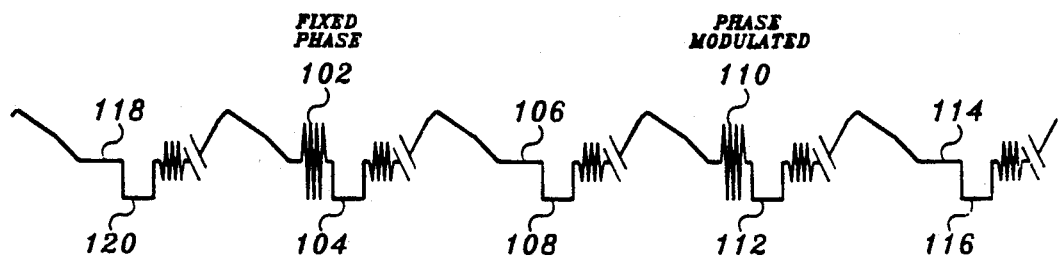
FIG. 7 is a waveform diagram of a portion of a typical video waveform modified in accordance with a first embodiment of the present invention for input to the equipment necessary for duplication of pre-recorded video distribution formats.

The FIG. 7 is a waveform diagram of a copy protection signal, similar to the signal 94 in the FIG. 5, which does not interfere with the viewability of an original or master video signal on a monitor device.

A burst of a stable 3.58 Mhz. sine wave, phase locked to the chroma subcarrier burst of a video signal, is inserted as shown as a copy protection signal 102 prior to a horizontal sync signal 104. The width of the inserted burst signal in this example is chosen to be approximately three S in duration, although the actual duration chosen can be varied as desired. The close proximity of the inserted signal 102 to the end of a horizontal line, combined with its short duration, places the inserted signal in an area usually overscanned by most monitor devices and is therefore not visible on the viewing screen of such a device.

The following line of video information is modified by recording a fixed luminance level copy protection signal 106, with no burst frequency component, prior to a horizontal sync pulse 108 and in a position similar to the position of the signal 102. The next line of video has a phase modulated 3.58 Mhz. copy protection signal 110 inserted prior to a horizontal sync pulse 112, again similar in position to the position of the signal 102. The area of the inserted modification on the next line of video information is modified in a fashion similar to the signal 106 as indicated by a copy protection signal 114 with no chroma frequency signal prior to a horizontal sync pulse 116. This sequence of modifications can be repeated throughout the video program material, as indicated by a copy protection signal 118 positioned prior to a sync pulse 120, and recorded onto a video cassette tape by a mastering VCR. During the record process, the mastering VCR processes the inserted signals as if they were normal chroma signals. When this recorded signal is reproduced, the comb filter used by the VCR to extract the chroma bandwidth signals from tape outputs two additional signals.

Figure 8:
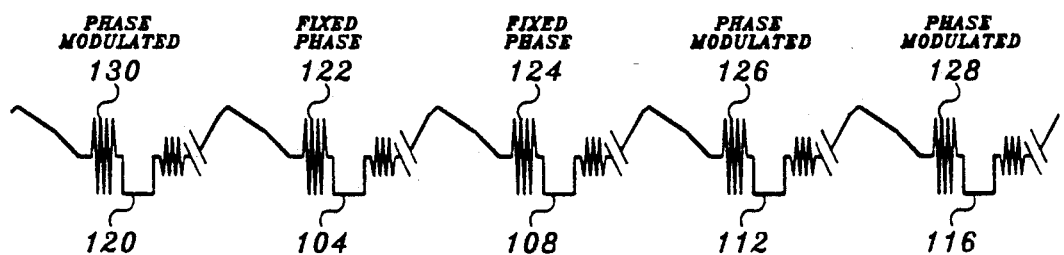
FIG. 8 is a waveform diagram of a video waveform output during reproduction of a distribution format recording of the video waveform shown in the FIG. 7.

The FIG. 8 is a waveform diagram of the video signal output from a typical VCR while reproducing a previously recorded video signal which was modified as shown in the FIG. 7. The originally inserted stable 3.58 Mhz. signal 102 is reproduced unchanged as shown by a signal 122. The next line of video, which originally had no inserted chroma frequency signal burst, now contains a comb filter created signal 124 similar to the signal 122. This phantom signal 124 is the signal 102 of the preceding line delayed by the 63.556 $\mu$S delay line in the VCR comb filter. As there is no current chroma information on this line (the fixed level 106 shown in the FIG. 7) to cancel in the comb filter differential amplifier, and because the delay line is outputting the signal from the previous line, the output from the comb filter differential amplifier is a stable copy of the inserted signal from the previous line. Because the delay line output in the typical comb filter shown in the FIG. 1 feeds the inverting input 54 of the differential amplifier 52, the signal 124 is similar but one hundred eighty degrees out of phase with the signal 122.

The next line of video information contains a copy of the originally recorded phase modulated signal 110 as shown by a signal 126. This signal is unaffected by the comb filter because the delay line 50 of a typical comb filter (FIG. 1) is outputting the signal of the previous line which, as shown by the signal 106 of the FIG. 7, contains no inserted chroma bandwidth signal. The current video line is then output from the amplifier 52 with no modification from the comb filter in the VCR.

The next line of video information, which was originally recorded with no chroma information in the area of the signal 114 (FIG. 7), now contains a phase inverted phantom copy signal 128 of the phase modulated signal 110. Because the sequence of signal insertions is continuous, the phase modulated signal 130 represents the delayed signal of the previous line. Thus, the signals 122 and 124 are of a fixed phase relationship, While the signals 126, 128 and 130 are of a phase modulated relationship. This playback waveform, as indicated in the FIG. 8, displays as a normal unmodified signal would. The inserted chroma bandwidth signals, as well as those signals created by the described action of the comb filter, are filtered from the video signal prior to sync signal separation by the low pass action of the luminance filter as described with respect to the FIG. 4, thus preventing these signals from interfering with the sync separating circuitry of a video monitor. If, however, an attempt is made to copy the video waveform shown in the FIG. 8, the comb filter of the VCR reproducing that copy will again modify the video signal upon playback of the new recording.

Figure 9:
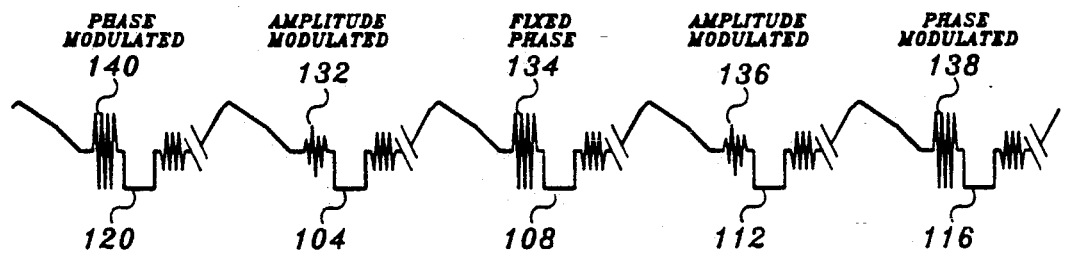
FIG. 9 is a waveform diagram of a video waveform output during reproduction of a recording of the video waveform shown in the FIG. 8.

The FIG. 9 is a waveform diagram of a video signal acted upon by a comb filter during the reproduction of a recorded copy of the signal shown in the FIG. 8. In the comb filter, the phase modulated signal 130 of the FIG. 8 is delayed and differentiated with the signal 122 of the FIG. 8 to produce a signal 132 as shown in the FIG. 9 prior to the sync pulse 104. This signal 132 is an amplitude modulated signal owing to the fact that one of the combined signals 130 is phase modulated and the other combined signal 122 is of a fixed phase relationship. As discussed relative to the operation of a comb filter, when the two signals 130 and 122 are one hundred eighty degrees out of phase, the comb filter output is at a maximum signal level. As the phase of the signal 130 varies, the amplitude of the comb filter output decreases, approximating zero output level as the two signals 130 and 122 come into phase with each other.

The next line of video prior to the sync pulse 108 will contain a fixed level chroma frequency signal 134 as shown in the FIG. 9. This signal results from the combining of the two fixed phase signals 122 and 124 of the FIG. 8 in the comb filter. As these two signals are one hundred eighty degrees out of phase with respect to each other, the comb filter outputs a steady near maximum signal level.

On the next line of video prior to the sync pulse 112, a signal 136 is amplitude modulated by differentiation within the comb filter of the signals 124 and 126 of the FIG. 8. Again, one of the signals is of a fixed phase relationship while the other is phase modulated. A signal 138 on the next line prior to the sync pulse 116 is the differentiated combination of the signals 126 and 128 of the FIG. 8. As these two signals are one hundred eighty degrees out of phase with each other, the comb filter again outputs a near maximum signal level identical to the signal 128 which still contains its original phase modulation. Similarly, a signal 140 prior to the sync pulse 120 is also phase modulated.

This sequence repeats, so that every other line of video contains an amplitude modulated signal prior to the horizontal sync pulses. With proper selection of the modulating frequency and waveform used to phase modulate the signal 110 of the FIG. 7, various amplitude modulation signal characteristics can be created in the positions indicated by the signals 132 and 136. If the amplitude modulation characteristics are chosen to include frequency components that are within the luminance bandwidth, these components will pass through the luminance filters of a typical monitor device as described with respect to the FIG. 4 and interfere with the sync signals as though they were similar to the interfering signals 94 of the FIG. 5.

To reiterate briefly, copy protection signals of particular frequency and phase characteristics are inserted into a video waveform, as shown in the FIG. 7, and recorded onto a master videotape. When this signal is played back, the comb filter in the VCR reproduction circuitry outputs the originally inserted signals, as well as phase inverted and delayed copies of the inserted signals as shown in the FIG. 8. This video waveform of the FIG. 8 can be displayed on a typical monitor device without anomaly, yet if recorded and played back again, the comb filter in the VCR reproduction circuitry now causes an output signal similar to that shown in the FIG. 9. As this video waveform now contains amplitude modulation component frequencies that fall within the luminance bandwidth, interference occurs with respect to the sync circuits in a typical monitor device.

As should be appreciated, the comb filter circuits are utilized to insert additional signals into a video waveform, as well as to convert them from phase modulation to amplitude modulation. It should also be appreciated that although the originally inserted signals of the FIG. 7 are shown as being of fixed phase (signal 102) and of modulated phase (signal 110), both signals can be phase modulated in an appropriate manner to produce similar results. These signals also can be modulated with greater deviation as in frequency modulation to achieve the desired amplitude modulation shown in the FIG. 9. Additionally, the inserted copy protection signals in this embodiment, as well as in other embodiments described herein, can be of various waveshapes. Furthermore, instead of or in combination with the previously mentioned modulation techniques, the waveshape of the inserted copy protection signals can modulate between differing waveshapes.

It should also be appreciated that the location of the desired interfering copy protection signals can be anywhere in a video waveform by the proper selection of the position of the originally inserted signals, with such position usually chosen to be in a location not displayed a monitor device.

When a chroma signal is phase or frequency modulated, that signal will be deviated away from its nominal phase relationship of $n \times \frac{1}{2} \int_H$. If deviated sufficiently, that phase relationship could approach or equal $n \times 17_H$, achieving the phase relationship of luminance signals. Similarly, a phase or frequency modulated luminance signal will be deviated away from its nominal phase relationship of $n \times \int_H$. If deviated sufficiently, that phase relationship could approach or equal $n \times \frac{1}{2} \int_H$, achieving the phase relationship of chroma signals. Therefore, it should be understood that the methods described herein encompass comb filter processing of luminance signals as well as that of chroma signals.

To create interfering signals in a position similar to that of the signals 96 of the FIG. 5, a video waveform is modified as shown in the FIG. 7, but with the inserted signals and modifications 102, 106, 110, 114 and 118 repositioned to the area occupied by the signal 96 of the FIG. 5.

As the entire vertical blanking interval of a video waveform is normally not displayed on a monitor device, it is possible to use a method similar to that shown in the FIG. 7 to also create interfering signals in the area of the vertical sync which is positioned within the vertical blanking interval. Through proper selection of signal insertion points and sequences, it is possible to create sync interfering amplitude modulation components in the areas occupied by the signals 98 and 100 of the FIG. 6.

Figure 10:
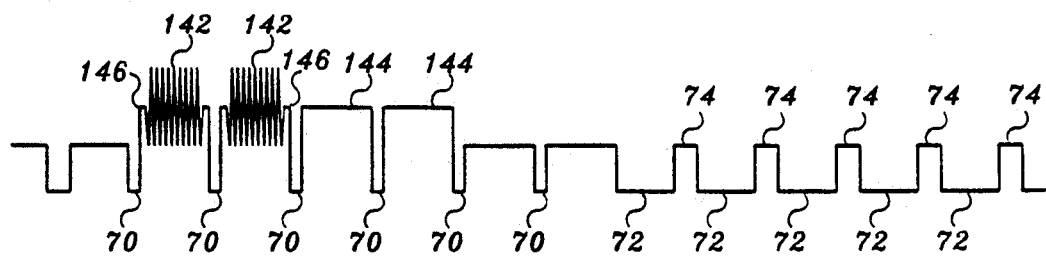
FIG. 10 is a waveform diagram of a portion of a typical video waveform modified in accordance with a second embodiment of the present invention.

The FIG. 10 is a waveform diagram of a second embodiment of the present invention which creates sync interfering signals in the area of vertical sync. In this embodiment, the delay characteristics of the comb filter are used to "move" the signal inserted into a video waveform one horizontal line every time the video waveform is recorded and reproduced. As indicated by a copy protection signal 142 of the FIG. 10, a stable 3.58 Mhz. signal, phase locked to the Video waveform burst frequency is inserted as shown, occupying a full horizontal line, two lines prior to the first of the vertical broad pulses 72. This inserted signal 142 is amplitude modulated at a desired frequency that will ultimately interfere with the sync separating process. As in the phase modulated signal insertions, the amplitude modulating frequency chosen can be of various frequencies and waveforms. The area of the inserted signal 142 is additionally modified by raising the luminance level, as shown by a copy protection signal 146, sufficiently to prevent the inserted signal modulation components from exceeding the sync threshold of the distribution format reproduction equipment or of the sync threshold in a typical monitor device. The next line of the video waveform is modified by inserting an elevated luminance signal as indicated by a copy protection signal 144 of a level similar to the signal 146. The next line of Video is unmodified, leaving its luminance level at the normal blanking level. The video waveform modified as in the FIG. 10 is then recorded onto the distribution format. When the recording of the signal shown in the FIG. 10 is reproduced, the comb filter in the reproducing equipment creates a delayed and phase inverted phantom copy of the signal 142.

Figure 11:
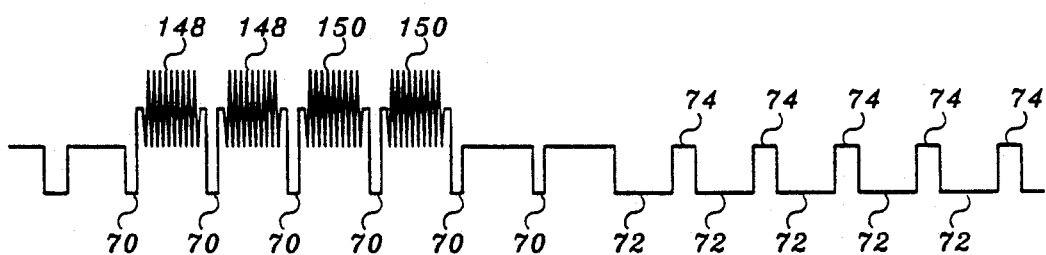
FIG. 11 is a waveform diagram of a video waveform output during reproduction of the distribution format recording of the video waveform shown in the FIG. 10.

FIG. 11 is a waveform diagram of the reproduction of a recording of the waveform shown in the FIG. 10 in the area of the vertical sync. Note that the signal 142 of the FIG. 10 reproduces unmodified as indicated by a signal 148. An additional delayed and phase inverted copy of the signal 142 is output by the comb filter and inserted onto the elevated luminance level 144 of the next line as indicated by a signal 150. The signal 150 contains the amplitude modulation characteristics of the originally inserted signal, but owing to the elevated luminance levels 146 and 144 in the areas of the signals 148 and 150 respectively, the modulation components of these signals that pass through the luminance filters of a typical monitor device, as described with respect to the FIG. 4, do not exceed the sync thresholds of the sync separating circuitry, and therefore do not interfere with the viewability of the displayed video signal.

Figure 12:
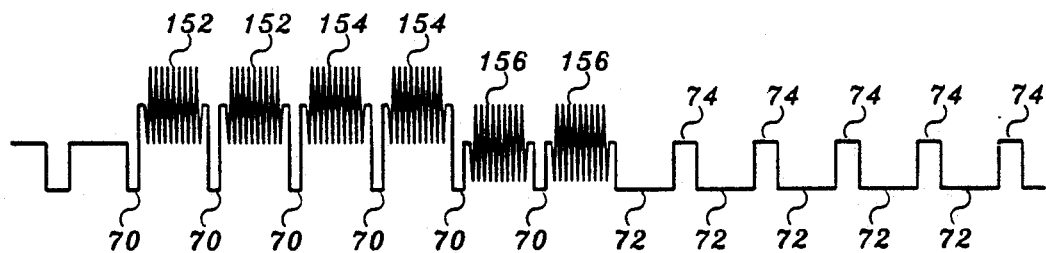
FIG. 12 is a waveform diagram of a video waveform output during reproduction of a recording of the video waveform shown in the FIG. 11.

The FIG. 12 is a waveform diagram of the result when a signal similar to that shown in the FIG. 11 is recorded and reproduced, as would occur when playing an unauthorized copy of a videotape prepared as shown in the FIG. 10. The comb filter in the reproducing equipment again modifies the video waveform. The signals 148 and 150 of the FIG. 11 are reproduced as indicated by signals 52 and 154, respectively, shown in the FIG. 12. The comb filter also outputs an additional delayed and phase inverted copy of the signal 150 of the FIG. 11 as indicated by a signal 156 of the FIG. 12. This phantom signal 156 is superimposed on the original luminance level of the video waveform so that modulation components of the originally inserted signal now exceed the sync threshold in a typical monitor device thereby interfering with the viewability of the displayed video.

In this example, as well as in other examples of embodiments of the present invention, the original distribution format is assumed to be a pre-recorded video cassette tape. The modified signal placed on a prerecorded medium can, however, be utilized with any video distribution format that uses a comb filter in the playback equipment necessary for the reproduction of that format. Such formats include many videotape and laser disc formats. The above method of using a comb filter to relocate an added signal, either alone or containing amplitude, frequency, or phase modulation components or combinations thereof, one horizontal line for each generation of recording can be used to locate the ultimate interfering components anywhere in a video waveform by proper selection of the original signal insertion points. The embodiment of the present invention described relative to the FIG. 7 can be combined with the embodiment described relative to the FIG. 10 using the phase modulation techniques of the first embodiment to produce the amplitude modulation components of the second embodiment before final shifting to a desired interfering location. Additionally, the vertical blanking interval can be further modified by replacing all but approximately the first two broad pulses 72 with a fixed or modulated level greater than the sync threshold. They can for example be replaced with a fixed blanking level signal to increase the sensitivity of video monitor sync separating circuitry to the copy protection signals.

All methods of the present invention discussed thus far have been with reference to distribution formats that use a comb filter within reproduction equipment. Additionally, all examples revealed thus far have been with regard to systems utilizing a one horizontal line delay in a comb filter. Various reproduction equipment designs can utilize multiple horizontal line delays within comb filter circuitry, such as in a two horizontal line delay comb filter. The signals described herein can be further modified by changing their insertion intervals and sequences such that the desired interfering signals are generated only while reproducing a copy of the distribution format reproduction signal.

Additionally, some reproduction equipment utilizes a multiple horizontal line delay comb filter referred to as a dynamic or adaptive comb filter. An adaptive comb filter compares the chroma subcarrier of a current line of video with that of a line which occurred one and two lines prior, or with a line prior and subsequent to the current line. The line most similar to the current line is chosen to be differentiated with the current line within the comb filter. These adaptive comb filters can unpredictably switch from a one line delay comb filter to a two line delay comb filter, dependent upon the line to line chroma signal correlation of the video program material. The embodiments of the present invention described herein can be utilized in systems using adaptive comb filters by further modification of chroma signals contained in the video program material. As some correlation detection circuits used in adaptive comb filters use averaging type detectors, that is, that they contain a time constant that looks for the closest correlation over a period of several lines, it is possible to modify the video program material in such a way that the average best correlation is selectively chosen to be of one line prior or two lines prior. For example, if it is desirable to insert the copy protection signals in a sequence suitable for reproduction equipment utilizing a one horizontal line delay comb filter, then it is also desirable to ensure that any equipment utilizing an adaptive comb filter remains in the one horizontal line delay comb filter mode. To this end, the chroma subcarrier information contained in the video program material can be modified in phase or amplitude, such that the correlation detection circuitry in the adaptive comb filter will always see best correlation when in the one horizontal line delay comb filter mode. This can be accomplished, as in but one example, by increasing sufficiently the amplitude of the subcarrier level on two contiguous lines of video program material, decreasing sufficiently the amplitude of the next two contiguous lines of video program material, and repeating this modification sequence. This forces the correlation averaging detection circuits of the adaptive comb filter to see the best correlation over time while in the one horizontal line delay comb filter mode. This modification can also be performed through the use of phase shifting of the chroma subcarrier signal instead of or in combination with the amplitude modifications, and the sequence of modifications can be altered to force the correlation detection circuits to switch the adaptive comb filter to either a one or two horizontal line delay comb filter as desired, without regard to the normal intended method of line correlation.

The methods described herein also can be used with distribution formats that permit modification of the video signal, prior to distribution, in an area of the distribution equipment signal flow where comb filters are not utilized. Such formats include radio frequency television broadcasts, cable distribution systems and satellite transmissions. The techniques discussed can be used with these and similar formats by modifying the signal insertions so that one pass through a comb filter in a VCR reproduction circuit produces the desired interfering signals.

Figure 13:
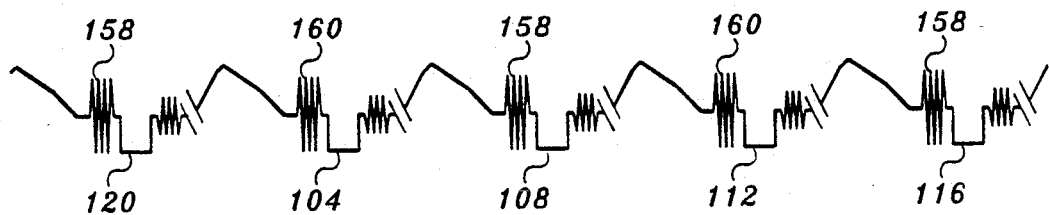
FIG. 13 is a waveform diagram of a portion of a typical video waveform modified in accordance with a third embodiment of the present invention, similar to the video waveform shown in the FIG. 7, intended for broadcast distribution formats.

The FIG. 13 is a waveform diagram of the relocation of signals similar to those shown in the FIG. 7 so that the signals can be broadcast by the above mentioned formats and viewed as normal on a receiving monitor device, wile creating sync interfering signals when recorded onto videotape and subsequently reproduced. A plurality of copy protection signals 158 in the FIG. 13 are fixed in phase, while other alternating copy protection signals 160 are phase modulated in accordance With a third embodiment of the present invention. A video signal modified as shown in the FIG. 13 is then transmitted via a distribution format mentioned in the previous paragraph. This video waveform will display properly on a monitor device for the same reason as will the waveform shown in the FIG. 8. When the transmitted waveform of the FIG. 13 is recorded by a VCR and played back, the comb filter in the VCR converts the phase modulated signals into amplitude modulated signals.

Figure 14:
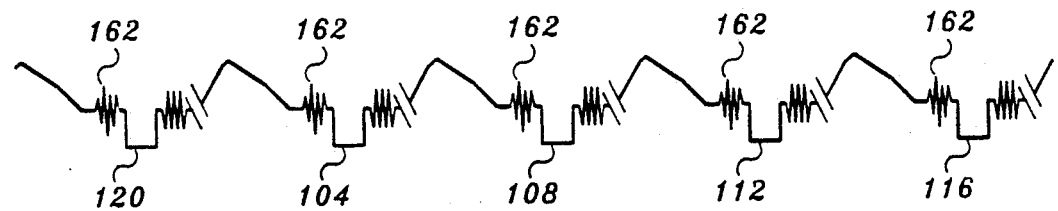
FIG. 14 is a waveform diagram of a video waveform output during reproduction of a recording of the video waveform shown in the FIG. 13.

The FIG. 14 is waveform diagram of a video waveform output from a VCR which is playing back a recording of the waveform f the FIG. 13. As the waveform of the FIG. 13 contains alternating inserted fixed and phase modulated signals, very line of video in the areas of modification shown in he FIG. 14 contains amplitude modulation signals 162. These signals are similar to and created for the same reasons as the signals 32 and 136 of the FIG. 9, except for the fact that they now occur on every line of video as proposed to the every other line occurrence of the waveform in the FIG. 9.

Figure 15:
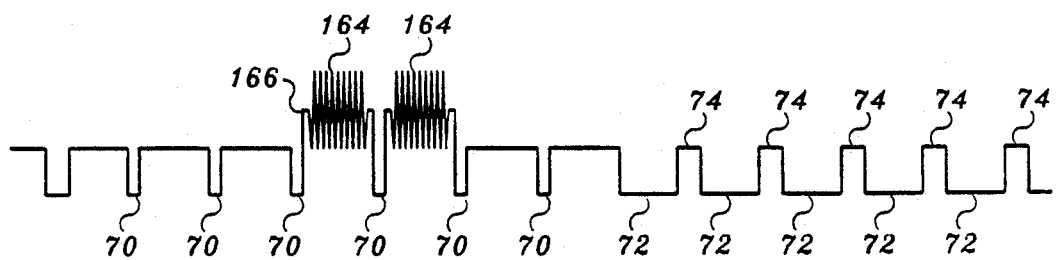
FIG. 15 is a waveform diagram of a portion of a typical video waveform modified in accordance with a fourth embodiment of the present invention, similar to the video waveform shown in the FIG. 10, intended for broadcast distribution formats.

The FIG. 15 illustrates how the signals as described with respect to the FIG. 10 can be modified for broadcast by the aforementioned formats. In this fourth embodiment of the present invention, a signal possessing the same characteristics as the signal 142 of the FIG. 10 is repositioned as indicated by a copy protection signal 164 in the FIG. 15 onto an elevated blanking level copy protection signal 166. This location is similar to that of the signal 150 in the FIG. 11, in that it is positioned two horizontal lines prior to the vertical sync. A video waveform modified as shown in the FIG. 15 is then broadcast via the transmitted distribution format. When the video waveform of the FIG. 15 is viewed on a receiving video monitor, it is displayed without anomaly similar to and for the same reasons as the waveform of the FIG. 11.

Figure 16:
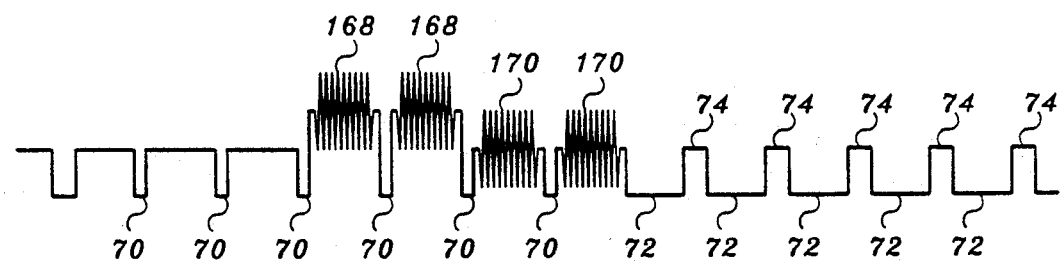
FIG. 16 is a waveform diagram of a video waveform output during reproduction of a recording of the video waveform shown in the FIG. 15.

The FIG. 16 illustrates a video waveform which is output from a VCR when the received waveform modified as in the FIG. 15 is recorded and played back. The signal 164 is reproduced as a signal 168. Additionally, the comb filter in the reproducing equipment creates a delayed and phase inverted Copy of the signal 164 as a signal 170. This phantom signal 170 is now positioned similar to the signal 156 of the FIG. 12 and creates sync interference in a monitor device.

Figure 17:
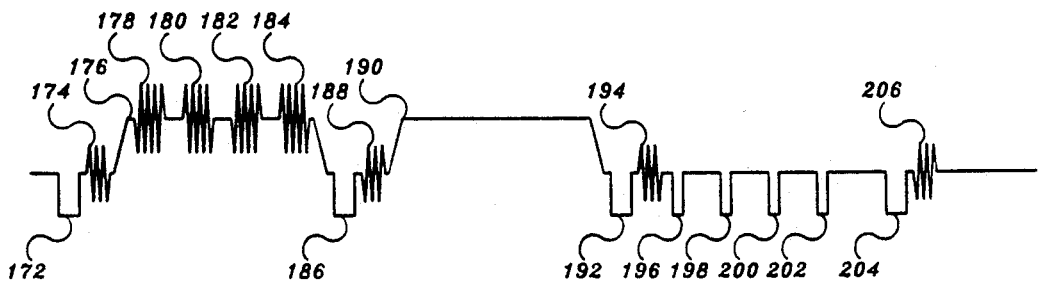
FIG. 17 is a waveform diagram of a portion of a typical video waveform modified in accordance with a fifth embodiment of the present invention to be input to the equipment necessary for duplication of pre-recorded video distribution formats.

The FIG. 17 is a waveform diagram of a fifth embodiment of the present invention which creates signals which will interfere with the burst sampling circuitry of a VCR or monitor device. In this embodiment, the comb filter is used to create phantom chroma bandwidth signals in a manner similar to the earlier described embodiments. However, in this instance, the chroma signals are relocated onto false back porch areas, causing the chroma circuitry in a VCR or monitor device to sample the phantom chroma signals as if they were normal burst signals on the back porch of horizontal sync pulses. A useful location for this technique is within the vertical blanking interval, following the vertical sync and equalization pulses.

Although a line of video can contain varying durations of inserted chroma signal up to the duration of a horizontal line, in the example shown in the FIG. 17, copy protection signals as bursts of chroma 178, 180, 182 and 184 are inserted at intervals along one horizontal line upon a luminance level copy protection signal 176. Raising the blanking level voltage to the luminance level 176 allows chrominance levels greater than forty IRE units to be inserted without exceeding the sync threshold. A normal burst 174 on the back porch of a horizontal sync pulse 172 precedes the inserted false burst signals. The following line of video is preceded by a horizontal sync pulse 186 and a normal burst 188, and contains only a luminance level copy protection signal 190. The next line of video is preceded by a horizontal sync pulse 192 and a normal burst 194, and contains copy protection signals as negative going pulses 196, 198, 200 and 202 which extend into the sync threshold. The duration of these pulses is such that they are wide enough to trigger burst gate circuitry in a VCR or monitor device. The next line of video begins with a horizontal sync pulse 204 and a normal burst 206, and can contain another repetition of inserted chroma burst copy protection signals. The normal bursts 174, 188 and 194 can be eliminated in some instances.

Figure 18:
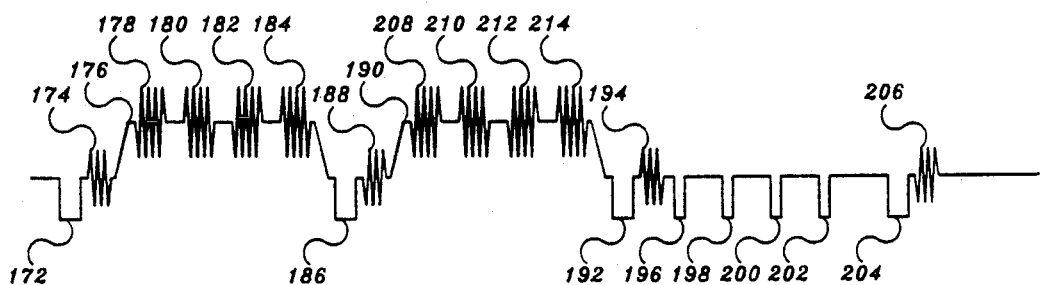
FIG. 18 is a waveform diagram of a video waveform output modified in accordance with a sixth embodiment of the present invention during reproduction of a distribution format recording of the video waveform shown in the FIG. 17.

The FIG. 18 is a waveform diagram of the action of a comb filter while reproducing a previously recorded video signal modified as shown in the FIG. 17. The first line of video is reproduced normally as indicated by the false burst signals 178, 180, 182 and 184. The action of the comb filter, as described previously, will produce phantom recreations of the inserted chroma signals as signals 208, 210, 212 and 214. This waveform will display in a normal manner when viewed on a monitor device. If an attempt is made to copy this video signal, the recording VCR will record the newly created phantom signals along with the original video waveform.

Figure 19:
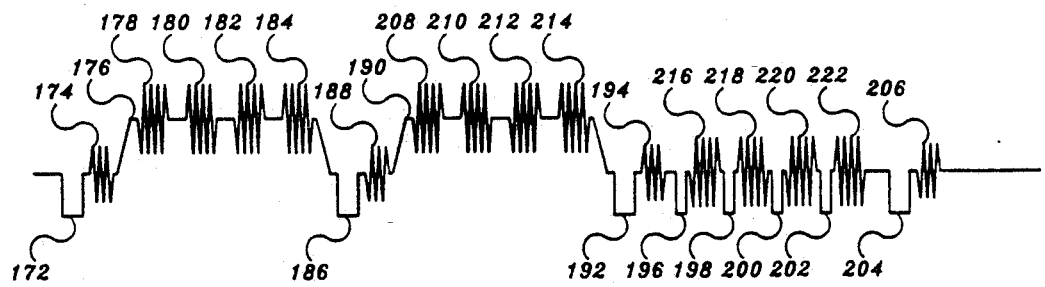
FIG. 19 is a waveform diagram of a video waveform output during reproduction of a recording of the video waveform shown in the FIG. 18.

The FIG. 19 is a waveform diagram of the result of reproducing such a recorded copy of the signal described with respect to the FIG. 18. The action of the comb filter in the reproduction circuitry of a VCR upon playback now creates phantom copies of the signals 208, 210, 212 and 214, as shown by signals 216, 218, 220 and 222, respectively. Due to the proximity of these newly created signals to the negative going pulses 196, 198, 200 and 202, the circuitry of a monitor device responsible for sampling burst will instead sample the signals 216, 218, 220 and 222.

By inserting the original chroma signals 178, 180, 182 and 184 which are non-coherent in terms of frequency, phase, and amplitude with regard to the standard chroma burst present in a video waveform, a disturbance can be created in circuitry which depends upon burst signals for a reference. Such circuits include, but are not limited to, those used for maintaining proper chroma saturation and hue, operation of color killer circuitry and digital countdown circuits in scanning controllers. In addition to disturbing the circuitry in a monitor device which relies upon proper burst sampling, certain circuits in a VCR can be disturbed by the sampling of incorrect burst signals upon playback or subsequent re-recording. The affected circuits can include those mentioned above for monitor devices, as well as circuits unique to a VCR such as velocity error correction servo circuitry which relies upon an accurate burst for proper operation.

The modifications to the inserted chroma signals can be systematic or transitory in nature. One systematic method of modification is to continually increment or decrement the frequency of the inserted signals over a course of time, so as to induce the local subcarrier generator circuit in a monitor or VCR to follow the frequency of the inserted signals. In this manner, the frequency of the local subcarrier generator can be coaxed or drawn far enough away from its nominal operating frequency to cause a loss of phase lock to the normal burst signal. Instead of or in addition to varying the frequency, the phase and amplitude of the inserted chroma signals, such signals can be modulated by various other means including gating on or off at specific intervals, changing the waveshape, or changing the location of the inserted signals.

A sixth embodiment of the present invention suitable for broadcast formats can be utilized by direct transmission of the waveform shown in the FIG. 18. This waveform will display normally as received. However, when this signal is recorded and subsequently reproduced by a VCR, the waveform output from the VCR during reproduction will be that of the FIG. 19 which will cause anomalies as previously described. The signals 178, 180, 182 and 184 can be eliminated in some instances.

Figure 20:
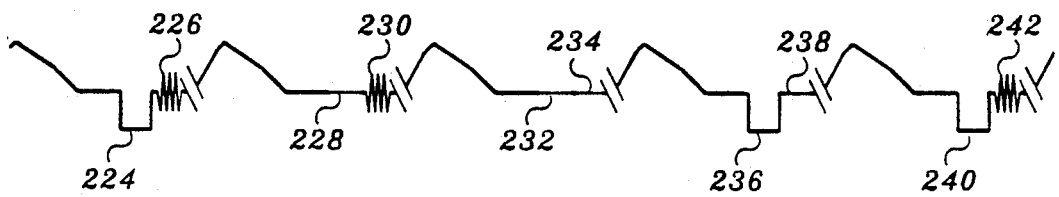
FIG. 20 is a waveform diagram of a portion of a typical video waveform modified in accordance with a seventh embodiment of the present invention to be input to the equipment necessary for duplication of pre-recorded video distribution formats.

The FIG. 20 is a waveform diagram modified in accordance with a seventh embodiment which illustrates another distribution format for causing incorrect burst sampling in a VCR or monitor device. A normal line of video begins with a horizontal sync pulse 224 and a normal burst 226. The next line of video contains a blanking level copy protection signal 228 in the position normally occupied by a horizontal sync pulse. A modified burst copy protection signal 230 is placed in a position normally occupied by a burst and contains perturbations which are non-coherent with a normal burst as described previously. The following line of video has copy protection signals as blanking levels 232 and 234 in the place of the normal horizontal sync and burst, respectively. In some instances, the luminance voltage at the locations 226, 230 and 234 can be raised to allow chrominance levels greater than forty IRE units to be inserted without exceeding the sync threshold. The next line of video contains a horizontal sync pulse 236 in its normal position, but has a blanking level copy protection signal 238 in the position normally occupied by a burst. The following line of video contains a normal horizontal sync 240 and a normal burst 242.

Figure 21:
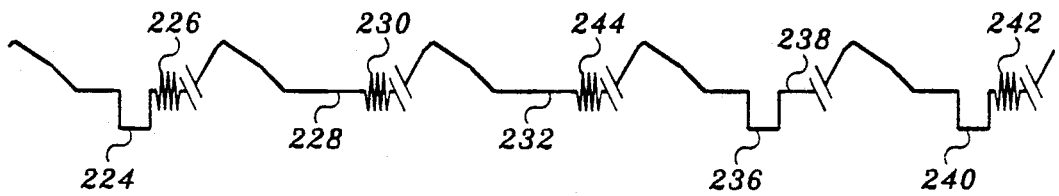
FIG. 21 is a waveform diagram of a video waveform output during reproduction of a distribution format recording of the video waveform shown in the FIG. 20.

The FIG. 21 is a waveform diagram of the action of a comb filter while reproducing a previously recorded video signal modified as in the FIG. 20. The chroma bandwidth signals contained within the first two lines of video are reproduced as indicated by the normal burst 226 and the modified burst 230. However, the action of a comb filter in the reproduction circuitry of a VCR now produces a phantom copy of the modified burst 230 as shown by a signal 244.

Figure 22:
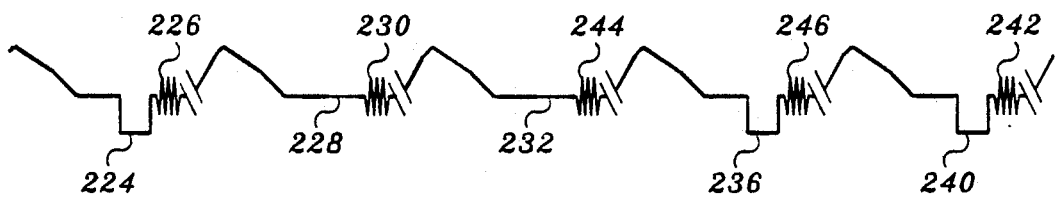
FIG. 22 is a waveform diagram of a video waveform output during reproduction of a recording of the video waveform shown in FIG. 21.

The FIG. 22 is a waveform diagram of the result of reproducing a recorded copy of the signal described with respect to the FIG. 21. The chroma bandwidth signals contained within the first three video lines reproduce as evidenced by the signals 226, 230 and 244. However, the action of a VCR comb filter now produces a phantom modified burst signal 246. The burst gate circuitry in a monitor device will be triggered as normal by the horizontal sync pulse 236. The perturbations contained within the modified burst signal 246 will cause a disruption of circuitry which relies upon this burst signal for reference.

An eighth embodiment of the present invention suitable for broadcast formats can be obtained by transfiguring the waveform described in the FIG. 20. The change would consist primarily of inserting a normal horizontal sync pulse at the location 232 so that one passage through a comb filter will produce a modified burst signal on the back porch 234 of a horizontal sync pulse.

Figure 23:
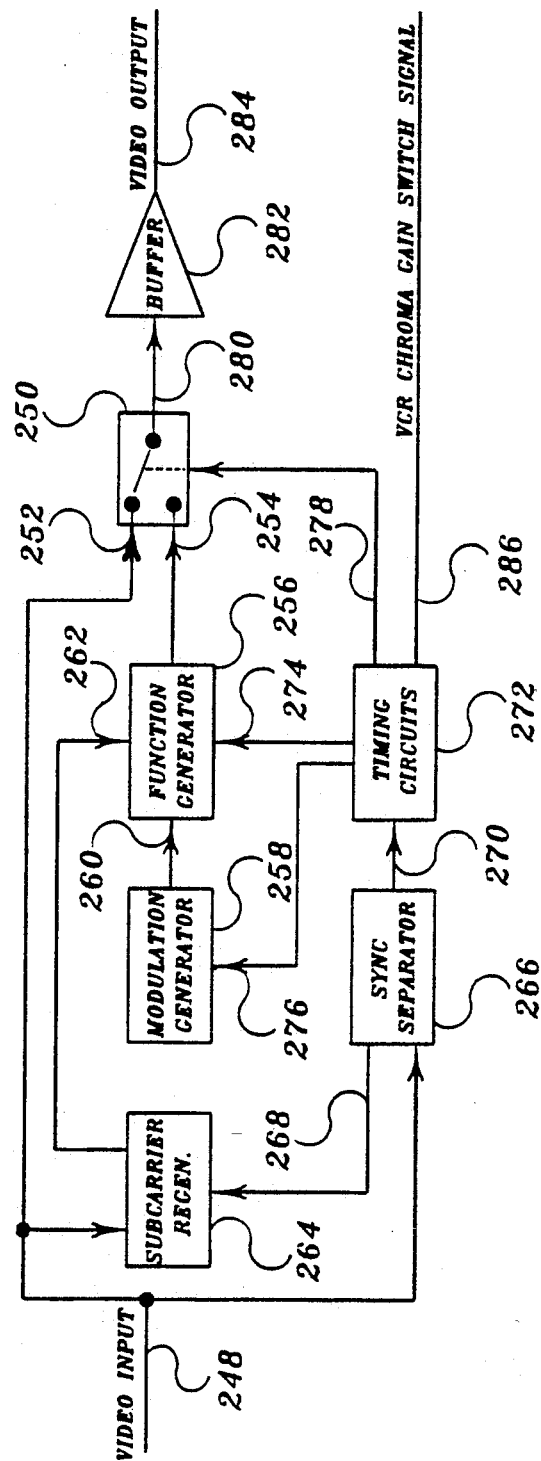
FIG. 23 is a schematic block diagram of an apparatus capable of generating and inserting the copy protection signals into a video waveform in accordance with the present invention.

The FIG. 23 is a schematic block diagram exemplifying one design of an apparatus capable of producing the above described signals, although various methodologies can be employed. A video input line 248 is connected to one input 252 of an electronically controlled switching device 250. A second input 254 to the switching device 250 is connected to an output of a function generator 256. The function generator 256 is capable of generating chroma frequency signals of various amplitudes and waveforms to be inserted into a video signal via the switching device 250. The function generator is also capable of being phase, frequency, and amplitude modulated by a modulation generator 258 having an output connected to a modulation input of the generator 256 by a line 260. The function generator 256 is also capable of being phase locked to a chroma subcarrier via an external phase input which is connected by a line 262 to an output from a phase locked local subcarrier regenerator 264. The video input line 248 is connected to an input of the subcarrier regenerator 264.

The video input line 248 is also connected to an input of a sync separator 266. The sync separator generates a pulse at an output connected by a line 268 to an input of the subcarrier regenerator 264 to identify the location of the chroma burst signal to which the subcarrier regenerator 264 is phase locked. The sync separator 266 also produces horizontal and vertical sync pulses at an output connected by a line 270 to an input of timing circuits 272. The timing circuits 272 are capable of producing the signals necessary for controlling the generators 256 and 258. A pair of outputs of the timing circuits are connected via lines 274 and 276 to inputs of the generators 262 and 258 respectively. The timing circuits 272 also provide a pulse at an output connected by a line 278 to an actuating input of the electronic switch 250 to switch at the correct time to insert the generated signals into a video signal. An output of the electronic switch 250 is connected by a line 250 to an input of a video buffer 282 having an output connected to a video output line 284 to feed the necessary distribution format equipment.

In order to record the desired amplitude of inserted chroma signals, it may be necessary in some cases to defeat automatic chroma gain control circuitry or to boost the chroma record level within a mastering VCR. To this end, the timing circuits 272 additionally output a VCR chroma gain switch signal at an output connected to a line 286 which is optionally fed to the mastering VCR. This signal can be used to activate chroma gain boost circuitry modifications, or to defeat the chroma AGC as necessary during the interval that the inserted chroma bandwidth signal modifications are recorded onto tape. The mastering VCR can be modified by adding an electronic switching device to existing circuitry within the VCR which accomplishes the gain change, and is controlled by the signal on the line 286.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for processing a video signal formed of successive video signal lines of information so as to inhibit the making of acceptable videotape recordings therefrom while producing a normal picture on a video monitor therefrom comprising the steps of:
  a. identifying a predetermined signal portion in a video signal line of information of a video signal which is detected by signal reproduction circuitry in at least one of a video monitor and a VCR; and
  b. generating at least one copy protection signal and adding said copy protection signal to said predetermined signal portion to form a modified video signal whereby upon reproduction of said modified video signal, said copy protection signal does not interfere with the visual display of a normal picture on a video monitor, and upon subsequent videotape recording and subsequent reproduction of said modified video signal by processing said modified video signal through a comb filter present in a VCR, said copy protection signal is altered by the comb filter, the comb filter delaying said copy protection signal by at least one video signal Tine, inverting said copy protection signal and summing said inverted copy protection signal with a non-delayed video signal line of the video signal to interfere with the normal operation of the video monitor signal reproduction circuitry to prevent the visual display of a normal picture.

2. The method in accordance with the claim 1 wherein said copy protection signal added in the step b. is a chroma bandwidth signal.

3. The method in accordance with the claim 2 including modulating said chroma bandwidth signal by at least one of an amplitude modulation signal, a frequency modulation signal and a phase modulation signal.

4. The method in accordance with the claim 2 including repeating the step b. for one or more subsequent lines of information.

5. The method in accordance with the claim 2 wherein said chroma bandwidth signal has a predetermined signal waveform, a predetermined signal frequency and a predetermined signal duty cycle and including repeating the step b. for one or more subsequent lines of information and modulating said chroma bandwidth signal by changing at least one of said predetermined signal waveform, signal frequency and signal duty cycle.

6. The method in accordance with the claim 1 wherein said video signal line of information and said modified video signal have a predetermined luminance bandwidth and through processing by the comb filter, said copy protection signal is amplitude modulated and includes frequency components in said predetermined luminance bandwidth of said video signal line of information to interfere with the normal operation of a video monitor sync circuit.

7. The method in accordance with the claim 1 wherein through processing by the comb filter, said copy protection signal is amplitude modulated.

8. The method in accordance with the claim 1 wherein said copy protection signal added in the steb b. is added adjacent and prior to a horizontal sync pulse in the video signal.

9. The method in accordance with the claim 8 including repeating the step b. for subsequent lines of information and wherein said copy protection signals added to successive ones of said lines of information are one copy protection signal of a fixed phase, one copy protection signal of a fixed luminance level, one copy protection signal of a modulated phase, and one copy protection signal of a fixed luminance level.

10. The method in accordance with the claim 8 including repeating the step b. for subsequent liens of information and wherein said copy protection signals alternate between one copy protection signal of a chroma bandwidth and one copy protection signal of a fixed luminance level.

11. The method in accordance with the claim 8 including repeating the step b. for subsequent lines of information and wherein said copy protection signals alternate between one copy protection signal of a fixed phase and one copy protection signal of a modulated phase.

12. The method in accordance with the claim 1 wherein said predetermined signal portion identified in the step a. is located within the vertical blanking interval of the video signal.

13. The method in accordance with the claim 1 including raising the blanking level of predetermined lines or portions of liens of the video signal to a predetermined level to prevent said copy protection signals from exceeding a sync circuit threshold of the video monitor.

14. The method in accordance with the claim 1 wherein said predetermined signal portion is spaced from a line of information having a normal blanking level whereby the action of the comb filter in the VCR will cause said copy protection signals to effectively be moved to said line of information having a normal blanking level and said copy protection signal exceeds a sync threshold of the video monitor thus producing an unacceptable visual display.

15. The method in accordance with the claim 1 wherein said predetermined signal portion identified in the step a. is located within at least one of the vertical sync broad pulses in the video signal.

16. The method in accordance with the claim 1 wherein said predetermined signal portion identified in the step a. is located within a vertical blanking interval of said video signal prior to a plurality of vertical sync pulses such that upon recording and subsequent reproduction of said modified video signal, said copy protection signals appear within at least one of the vertical sync pulses.

17. The method in accordance with the claim 1 wherein said copy protection signal added in the step b. is added within a horizontal sync pulse in the video signal 18. The method in accordance with the claim 1 wherein said predetermined signal portion identified in the step a. is located in dependence upon the number of horizontal lines of delay to be produced by processing through the comb filter.

19. The method in accordance with the claim 1 including repeating the step b. whereby different ones of said copy protection signal including chroma bandwidth copy protection signals are added to successive lines of information such that ones of the lines of information intended to be combined by the comb filter to interfere contain added chroma bandwidth copy protection signals which are more closely correlated than chroma bandwidth copy protection signals in ones of the liens of information which are not intended to be combined to interfere.

20. The method in accordance with the claim 1 wherein said modified video signal has a chroma subcarrier signal of said modified video signal for one or more contiguous lines of information to force a comb filter present in the VCR to operate in a chosen horizontal line delay mode.

21. The method in accordance with the claim 1 wherein said modified video signal has a chroma subcarrier signal and the steps a. and b. include phase modulating a chroma subcarrier signal of said modified video signal for one or more contiguous lines of information to force a comb filter present in the VCR to operate in a chosen horizontal line delay mode.

22. The method in accordance with the claim 1 including repeating the step b. while changing a frequency of said copy protection signal whereby the frequency of said copy protection signal is incrementally increased or decreased to draw a local chroma subcarrier generator in the video monitor signal reproduction circuitry away from its center frequency.

23. The method in accordance with the claim 1 including selecting characteristics of said predetermined signal portion and said copy protection signal which when said modified video signal is processed by the comb filter in a VCR, said copy protection signal interferes with the normal operation of burst sampling circuitry to prevent the visual display of a normal picture.

24. The method in accordance with the claim 23 wherein said copy protection signal has chroma bandwidth and luminance bandwidth level characteristics and including selecting said chroma bandwidth and luminance bandwidth level characteristics for said copy protection signal to prevent said copy protection signal from exceeding a sync threshold of video monitor sync circuitry.

25. The method in accordance with the claim 23 including in the step b. adding at least one negative going pulse as one of said copy protection signals.

26. The method in accordance with the claim 23 including adding at least one chroma bandwidth signal as one of said copy protection signals.

27. The method in accordance with the claim 26 including selecting said characteristics to permit said chroma bandwidth copy protection signal to be altered by the comb filter to appear on a back porch of said negative going pulse.

28. The method in a accordance with the claim 26 including selecting said characteristics to permit said chroma bandwidth copy protection signal to be altered by the comb filter to appear on a back porch of a horizontal sync pulse.

29. A method for processing a video signal formed of successive video signal lines of information so as to inhibit the making of acceptable videotape recordings therefrom while producing a normal picture on a video monitor therefrom comprising the steps of:
   a. identifying a predetermined signal portion in a video signal line of information of a video signal which when said video signal line of information is processed by a comb filter in a VCR, said predetermined signal portion will be detected by video signal reproduction circuitry in at least one of a video monitor and a VCR;
   b. generating and adding a chroma bandwidth signal to said predetermined signal portion; and
   c. repeating the steps a. and b. for one or more subsequent lines of information to form a modified video signal whereby upon reproduction of aid modified video signal, said chroma bandwidth signals do not interfere with the visual display of a normal picture on a video monitor, and upon subsequent processing by a comb filter present in a VCR, said chroma bandwidth signals are altered by the comb filter, the comb filter delaying said chroma bandwidth signals by one video signal line, inverting said chroma bandwidth signals and summing each of said inverted chroma bandwidth signals with a non-delayed video signal line of the video signal to interfere with the normal operation of the video signal reproduction circuitry in a video monitor to prevent the visual display of a normal picture.

30. The method in accordance with claim 29 including modulating said chroma bandwidth signals by at least one of an amplitude modulation signal, a frequency modulation signal and a phase modulation signal to produce false triggering of the video monitor sync circuit.

31. An apparatus for processing a conventional video signal to produce a normal picture on a video monitor and inhibit the making of acceptable videotape recordings thereof comprising: means for adding chroma bandwidth signals to predetermined signal portions of a conventional video signal, said chroma bandwidth signals having predetermined frequency, waveshape and modulation characteristics whereby upon recording and reproduction by a VCR, said chroma bandwidth signals will be delayed and differentiated by a comb filter in the VCR to produce an interference in the picture.

32. The apparatus according to claim 31 wherein said means for adding chroma bandwidth signals includes a video signal input lines, an electronically controlled switching device having a first input connected to said video signal input line, a function generator for generating chroma frequency signals of various amplitudes and waveforms to be inserted into a video signal via said switching device and having an output connected to a second input of said switching device, a modulation generator for phase, frequency and amplitude modulating said function generator and having an output connected to a first input of said function generator, a subcarrier regenerator for generating a chroma subcarrier to phase lock said function generator and having a n output connected to a second input of said function generator and a first input connected to said video input lines, a sync separator for generating a pulse at a first output connected to a second input of said subcarrier regenerator for identifying the location of the chroma burst signal to which said subcarrier regenerator is phase locked and for generating horizontal and vertical sync pulses at a second output and having an input connected to said video signal input lines, timing circuits having an input connected to said second output of said sync separator and for generating signals for controlling said modulation generator and said function generator at first and second outputs connected to an input of said modulation generator and at a third input of said function generator respectively and having a third output connected to an actuating input of said electronic switch for switching at the correct time to insert said chroma frequency signals as copy protection signals into a video signal, a buffer having an input connected to an output of said electronic switch and having an output connected to a video output line.

33. The apparatus according to claim 31 wherein said timing circuits have a fourth output for generating a VCR chroma gain switch signal.

34. A method for modifying a video signal having successive lines of video information to prevent unauthorized copying comprising the steps of:
   a. identifying a predetermined signal portion in a video signal line of video information having predetermined characteristics;
   b. generating and adding at least one copy protection signal having predetermined characteristics to said predetermined signal portion to form a modified line of video information; and
   c. selecting said predetermined characteristics of said predetermined signal portion and said copy protection signal which when said modified video signal is recorded subsequently by a VCR and subsequently reproduced, a comb filter present in the VCR alters said copy protection signal by delaying by at least one video signal line, inverting said copy protection signal and combining said inverted copy protection signal with a non-delayed video signal line to interfere with the normal operation of the video signal reproduction circuitry in a video monitor or a VCR to prevent the visual display of a normal picture.

35. The method in accordance with the claim 34 including repeating the steps a. and b. for one or more subsequent lines of video information to form a modified video signal whereby upon reproduction of said modified video signal, said copy protection signals do not intefere with the visual display of a normal picture on a video monitor.

36. A method for modifying a video signal having successive lines of video information to prevent unauthorized copying comprising the steps of:
   a. identifying a predetermined signal portion having predetermined characteristics in a video signal;
   b. generating and adding at least one chroma bandwidth copy protection signal having predetermined characteristics to said predetermined signal portion to form a modified video signal; and
   c. selecting said predetermined characteristics of said predetermined signal portion and said copy protection signal which when said modified video signal is subsequently reproduced, said copy protection signal interferes with the normal operation of video signal reproduction circuitry to prevent the visual display of a normal picture.

37. An apparatus for processing a conventional video signal to produce an acceptable master recording or transmission signal to display a normal picture on a video monitor and inhibit the display of a normal picture from a subsequent videotape recording thereof comprising: means for generating and adding chroma bandwidth signals to predetermined signal portions of a conventional video signal, said chroma bandwidth signals having predetermined frequency, waveshape and modulation characteristics whereby upon subsequent recording and reproduction by a VCR, said chroma bandwidth signals will be delayed and differentiated by a comb filter in the VCR to produce an interference in the picture.

* * * * *